(12) United States Patent
Roffman et al.

(10) Patent No.: US 6,491,392 B2
(45) Date of Patent: Dec. 10, 2002

(54) DYNAMICALLY STABILIZED CONTACT LENSES

(75) Inventors: Jeffrey H. Roffman, Jacksonville, FL (US); Philippe F. Jubin, Jacksonville, FL (US); Alex T. Washington, Jacksonville, FL (US)

(73) Assignee: Johnson & Johnson Vison Care, Inc., Jacksonville, FL (US)

( * ) Notice: Subject to any disclaimer, the term of this patent is extended or adjusted under 35 U.S.C. 154(b) by 0 days.

(21) Appl. No.: 09/732,647

(22) Filed: Dec. 8, 2000

(65) Prior Publication Data

US 2002/0071094 A1 Jun. 13, 2002

(51) Int. Cl.[7] .............................. G02C 7/04; G02C 7/02
(52) U.S. Cl. ............................. 351/160 R; 351/160 H; 351/177
(58) Field of Search .................. 351/160 R, 160 H, 351/161–162, 177

(56) References Cited

U.S. PATENT DOCUMENTS

| 4,095,878 A | | 6/1978 | Fanti ........................... 351/161 |
| 4,195,919 A | * | 4/1980 | Shelton ................... 351/160 R |
| 4,268,133 A | | 5/1981 | Fischer et al. ............... 351/161 |
| 4,324,461 A | | 4/1982 | Salvatori ................. 351/160 H |
| 5,020,898 A | | 6/1991 | Townsley ............... 351/160 R |
| 5,452,031 A | * | 9/1995 | Ducharme ................... 351/177 |
| 5,650,837 A | | 7/1997 | Roffman et al. ............. 351/161 |
| 5,953,098 A | * | 9/1999 | Lieberman et al. ...... 351/160 R |
| 6,241,355 B1 | * | 6/2001 | Barsky ........................ 351/177 |
| 6,244,709 B1 | * | 6/2001 | Vayntraub et al. ........... 351/161 |
| 6,264,328 B1 | * | 7/2001 | Williams et al. ............. 351/221 |

FOREIGN PATENT DOCUMENTS

| EP | 980015 A1 | 2/2000 |
| WO | WO 94/25887 | 11/1994 |
| WO | WO 00/58773 | 10/2000 |

OTHER PUBLICATIONS

ISR for PCT/US01/47902 priority for which is USSN 0–9/732,647.

* cited by examiner

Primary Examiner—Jordan M. Schwartz
(74) Attorney, Agent, or Firm—Lois Gianneschi

(57) ABSTRACT

Stabilized contact lens are provided in which the stabilization zones are obtained by using spline or polynomials to describe one or more peripheral portions of a surface of the lens. The lens' stabilization zones are smoothly integrated into the lens providing a lens that is both effectively stabilized on the eye and comfortable for the lens wearer.

14 Claims, 1 Drawing Sheet

DYNAMICALLY STABILIZED CONTACT LENSES

FIELD OF THE INVENTION

The invention relates to contact lenses. In particular, the invention provides contact lenses that incorporate one or more stabilization zones to stabilize the orientation of the lens in relationship to the eye.

BACKGROUND OF THE INVENTION

It is known that the correction of certain optical defects can be accomplished by imparting non-spherical corrective characteristics into a contact lens, such as cylindrical or multifocal characteristics. Additionally, advances in technology permit production of lenses customized to a particular wearer using corneal topographic and wave front aberration measurements. The use of these lenses may be problematic in that the lenses need to be maintained at a specific orientation while on the eye to be effective. However, a lens will rotate on the eye due to blinking as well as eyelid and tear fluid movement.

Lenses designed to maintain their on-eye orientation typically are of two general types. One type uses prism stabilization, or thickening of certain lens portions, to maintain orientation. Examples of prism stabilization methods include decentering the front relative to the back lens surface, prismatic balancing, thickening of the lower lens edge, supporting the lens on the lower eyelid, forming depressions or elevations on the lens' surface, and truncating the lens edge.

A second lens type, dynamically stabilized lenses, uses the movement of the eyelids to maintain lens orientation. Dynamic stabilization methods include reducing the thickness of the lens' outer surface at two symmetrically lying regions, typically top and bottom zones on the lens, while maintaining the thickness of the outer regions in the horizontal center axis.

The known methods for maintaining lens orientation suffer from a number of disadvantages including that lenses incorporating the methods require specialized, off-axis tooling for production, that these lenses are uncomfortable to wear, and that the known methods are not highly effective. Thus, a need exists for a method of maintaining on-eye orientation of a lens that overcomes some of these disadvantages.

DETAILED DESCRIPTION OF THE INVENTION AND PREFERRED EMBODIMENTS

It is a discovery of the invention that stabilized contact lens may be obtained by using spline or polynomials to generate one or more peripheral portions of a surface of the lens. The invention provides an effective method, and lenses incorporating that method, for on-eye lens stabilization. The invention permits the design of the lens' peripheral stabilization zones to be carried out with a high degree of control. The resulting lens' stabilization zones are smoothly integrated into the lens surface providing a lens that is both effectively stabilized on the eye and comfortable for the lens wearer. Additionally, the lenses may be produced using computer numerically controlled ("CNC") coding without the need for specialized tooling.

In one embodiment, the invention provides a contact lens comprising, consisting essentially of, and consisting of an optic zone, a peripheral portion and one or more thin zones in the peripheral portion, wherein the one or more thin ones are generated using a function that is a spline, a high order polynomial, or a combination thereof. In another embodiment, the invention provides a method for producing the contact lenses of the invention.

By "peripheral portion" is meant the area of the lens outside of the central optic zone. Typically, the peripheral portion of the lens may include, without imitation, a non-optical lenticular zone, a lens edge, a bevel, or a combination hereof. By "high order polynomial" is meant a polynomial of at least the $4^{th}$ order.

The lenses of the invention may be either hard or soft contact lenses. Preferably, the lenses are soft contact lenses. The one or more thin zones may be located on the front surface, the back surface, or both surfaces. By "front surface" is meant the object side of the lens. By "back surface" is meant the surface of the lens that rests on the eye. Preferably, the one or more thin zones are on the front surface.

Further, the lenses of the invention may have any of a variety of corrective optical characteristics incorporated onto either or both the front and back surfaces. For example, the lens may have any one or more of spheric, aspheric, bifocal, multifocal, prismatic, or cylindric corrections, or combinations thereof. Additionally, the surfaces may be surfaces calculated from corneal topographic measurements, or topographically—derived surfaces, surfaces calculated from wavefront aberration measurements of the eye, and the like and combinations thereof.

Figure 1:
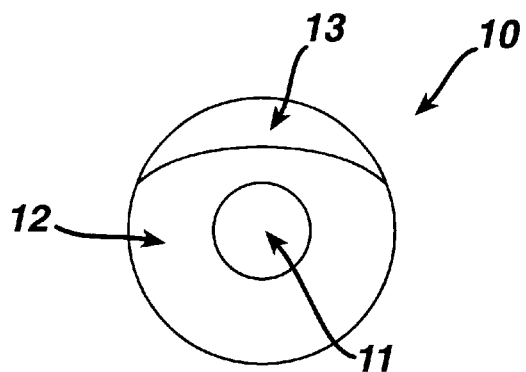
FIG. 1 illustrates a magnified, plan view of a front surface of an embodiment of the lens of the invention.
Figure 2:
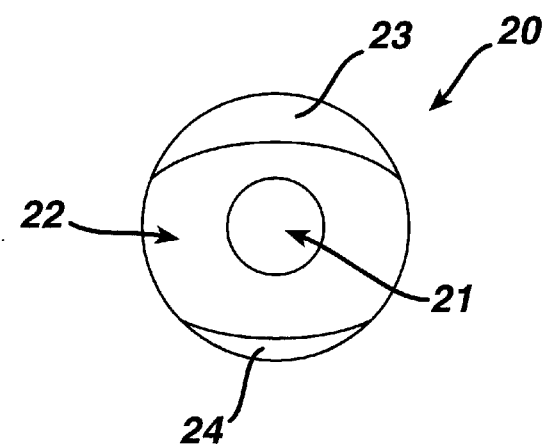
FIG. 2 illustrates a magnified, plan view of a front surface of a second embodiment of the lens of the invention.
Figure 3:
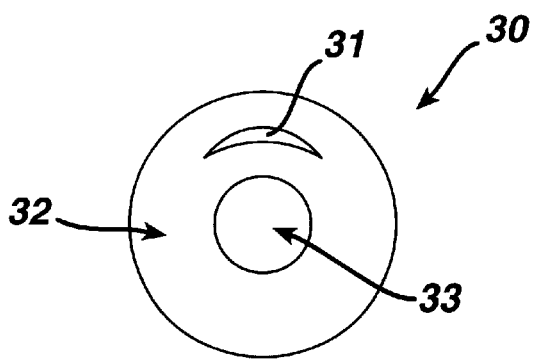
FIG. 3 illustrates a magnified, plan view of a front surface of a third embodiment of the lens of the invention.

The location, thickness, and symmetry of the thin zones may be any of a wide variety of combinations. Referring to FIG. 1, a lens 10 is shown with optic zone 11, and peripheral portion 12 which is a non-optical lenticular zone. Thin zone 13 is shown, which is centered about the 90 degree axis of lens 10. In FIG. 2 is depicted lens 20 with optic zone 21, lenticular zone 22 and thin zones 23 and 24, which are asymmetrical. In FIG. 3 is shown lens 30 wherein thin zone 31 is shown in lenticular zone 32.

The thin zones may be located at any position on the lens surface that is outside of the optic zone, preferably at least greater than about 200 microns from the outermost edge of the optic zone and within the non-optical lenticular zone. Most preferably, the lens includes a bevel and the thin zone or zones are located at least greater than about 200 microns from the edge of the optic zone and extend up to the innermost edge of the bevel. By "innermost edge of the bevel" is meant the edge of the bevel that is closest to the optic zone. If more than one thin zone is used, the zones each may be about the same radial distance from the lens' geometric center or this distance may vary.

In a preferred embodiment, at least one surface of the lens, preferably the back surface, is designed using corneal topographic data of an individual to correspond to all or a portion of the topography of the individual's cornea. By "correspond" means that the surface of the lens is designed so that it fits on the cornea in a hand-in-glove manner. This embodiment is advantageous in that the back surface will aid the rotational stability of the lens on the eye. In a more preferred embodiment, the back surface of the lens is designed using topographic data and either or both the front and back surfaces additionally correct for wavefront aberrations of the eye.

The thin zones of the lenses of the invention are generated, meaning that the curvatures of the zones are described, using a spline function, a high order polynomial functions, or combinations thereof. The difference in thickness between the thickest point of the lens outside of the thin zones and the thinnest point within the thin zones preferably is about 50 to about 300 microns, more preferably about 100 to about 200 microns.

The lenses of the invention may be produced by any conventional method for producing contact lenses. For example, the lens design may be cut into a metal and. the metal used to produce plastic mold inserts for the lens' surfaces. A suitable liquid resin is then placed between the inserts, the inserts compressed, and the resin cured to form the lens. Alternatively, the lens of the invention may be produced by cutting the lens on a lathe. One ordinarily skilled in the art will recognize that an advantage of the invention is that the lenses may be produced by the use of CNC lathing of the lenses or mold tools to produce the lenses.

Materials useful for forming the lenses of the invention may be any known materials used in the production of hard or soft contact lenses. Preferably, the material selected for forming the lenses of the invention is a material suitable for forming soft contact lenses. Suitable materials for forming such contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

What is claimed is:

1. A contact lens comprising, a front surface and a back surface, the front surface corresponding to all or a portion of a topography of an individual's cornea, an optic zone, a peripheral portion and one or more thin zones in the peripheral portion, wherein the one or more thin zones are generated using a function that is a spline, a high order polynomial, or a combination thereof.

2. The lens of claim 1, wherein the lens is a soft contact lens.

3. The lens of claim 1, wherein the one or more thin zones are located on a front surface of the lens.

4. The lens of claim 1, wherein the one or more thin zones are located on a back surface of the lens.

5. The lens of claim 1, wherein the one or more thin zones are located on a back and a front surface of the lens.

6. The lens of claim 1, wherein the back surface is calculated from wavefront aberration measurements of the eye.

7. The lens of claim 1, wherein the one or more thin zones are located at least greater than about 200 microns from an outermost edge of an optic zone of the lens.

8. A contact lens comprising, an optic zone, a peripheral portion and one or more thin zones in the peripheral portion, wherein the one or more thin zones are generated using a function that is a spline, a high order polynomial, or a combination thereof, wherein the one or more thin zones are located at least greater than about 200 microns from an outermost edge of the optic zone of the lens and wherein the peripheral portion comprises a non-optical lenticular zone and a bevel and wherein the one or more thin zones extends up to an innermost edge of the bevel.

9. The lens of claim 1 or 8, wherein the one or more thin zones are generated using a spline function.

10. The lens of claim 1 or 8, wherein the one or more thin zones are generated using a high order polynomial function.

11. A method for producing a contact lens, comprising the steps of generating a front surface and a back surface, the front surface corresponding to all or a portion of a topography of an individual's cornea, and generating one or more thin zones using a function that is a spline, a high order polynomial, or a combination thereof.

12. The method of claim 11, wherein the generating step is carried out using a spline function.

13. The method of claim 11, further comprising the step of providing a back surface of the lens corresponding to all or a portion of a topography of an individual's cornea.

14. The method of claim 13, further comprising the step of calculating a front surface, the back surface, or both surfaces of the lens from wavefront aberration measurements of an individual's eye.

* * * * *